(12) United States Patent
Wainner et al.

(10) Patent No.: US 8,307,423 B2
(45) Date of Patent: Nov. 6, 2012

(54) MIGRATING A NETWORK TO TUNNEL-LESS ENCRYPTION

(75) Inventors: W. Scott Wainner, Sterling, VA (US); Brian E. Weis, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 993 days.

(21) Appl. No.: 12/337,315

(22) Filed: Dec. 17, 2008

(65) Prior Publication Data

US 2010/0154028 A1    Jun. 17, 2010

(51) Int. Cl.
 *G06F 9/00*    (2006.01)
(52) U.S. Cl. ............... 726/15; 726/1; 726/12; 713/153; 705/79; 380/255; 370/351
(58) Field of Classification Search ............... 726/1, 12, 726/15; 713/153; 705/79; 380/255; 370/351
See application file for complete search history.

(56) References Cited

U.S. PATENT DOCUMENTS

| | | | | |
|---|---|---|---|---|
| 7,757,074 | B2 * | 7/2010 | Sundarrajan et al. | ......... 713/151 |
| 2006/0005240 | A1 * | 1/2006 | Sundarrajan et al. | ........... 726/15 |
| 2008/0320303 | A1 | 12/2008 | Khalid et al. | |
| 2009/0080657 | A1 | 3/2009 | Asati et al. | |
| 2010/0034207 | A1 * | 2/2010 | Mcgrew et al. | ............... 370/401 |
| 2010/0241846 | A1 * | 9/2010 | Sundarrajan et al. | ......... 713/151 |

OTHER PUBLICATIONS

Anonymous, "IPSec Passive Mode," Cisco IOS Software Feature Guide for Release 12.2(13)T, downloaded Apr. 29, 2009, published by Cisco Systems, Inc., San Jose, California, 10 pages.

Anonymous, "Cisco Group Encrypted Transport VPN: Tunnel-less VPN Delivering Encryption and Authentication for the WAN," Data Sheet, published by Cisco Systems, Inc., San Jose, California, Aug. 2007, 5 pages.

* cited by examiner

*Primary Examiner* — April Shan
(74) *Attorney, Agent, or Firm* — Hickman Palermo Truong Becker Bingham Wong LLP

(57) ABSTRACT

A method comprises, in a network comprising VPN gateway devices configured only for plaintext data communication, configuring a policy server with a security policy including DO NOT ENCRYPT statements temporarily overriding PERMIT statements defining which packets should be encrypted; selecting one sub-group of the VPN gateway devices in which tunnel-less encryption is not configured; configuring of the VPN gateway devices in the sub-group for tunnel-less encryption by: configuring each device in a passive mode of operation in which the device is configured to receive either encrypted packets or plaintext packets matching encryption policy; configuring local DO NOT ENCRYPT statements matching traffic that is currently being converted to ciphertext; removing, from the access control list of the policy server, DO NOT ENCRYPT statements referring to protected LAN CIDR blocks behind the VPN gateway devices in the selected sub-group; configuring the sub-group to send encrypted packets by removing, from each of the VPN gateway devices in the selected sub-group, the local DO NOT ENCRYPT statements for the CIDR blocks currently being converted and protected by the selected sub-group; repeating the configuring each of the VPN gateway devices in the selected sub-group for tunnel-less encryption, and the configuring the sub-group to send encrypted packets, for each other one of the sub-groups; and removing the passive mode on each of the VPN gateway devices.

21 Claims, 15 Drawing Sheets

MIGRATING A NETWORK TO TUNNEL-LESS ENCRYPTION

TECHNICAL FIELD

The present disclosure generally relates to network management.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Computer networks are often established using network elements that communicate data in non-encrypted, plain-text form. An example is a private network that uses multi-protocol label switching, or an MPLS VPN. After such a network is initially set up, a network administrator may wish to convert the network so that the network elements can communicate encrypted data. The administrator may wish to convert the network so that a tunnel-less encryption method (such as Cisco Group Encrypted Transport VPN or GET VPN) can be used.

In one approach, during the conversion process VPN gateways are expected to encrypt packets whenever possible, and send cleartext packets otherwise. However, tunnel-less VPN methods such as GET VPN have no concept of a peer, and therefore the state of a peer is not known to a VPN gateway. This problem causes difficulty in performing a conversion. Further, present techniques for converting networks are complicated and disruptive.

DETAILED DESCRIPTION

Figure 1A:
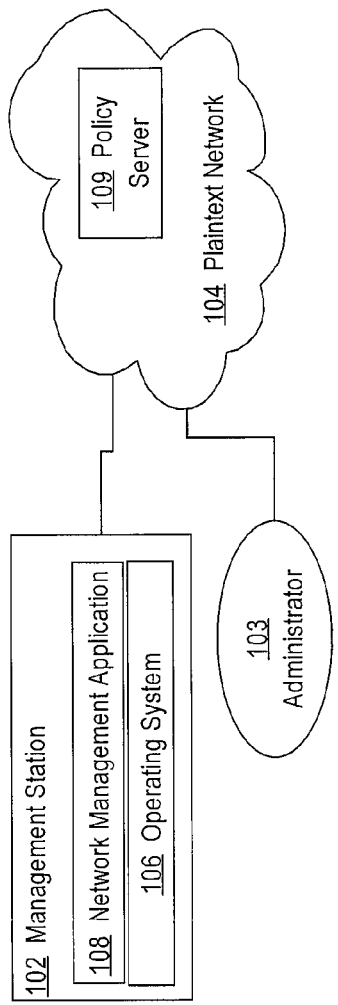
FIG. 1A illustrates a network configured with a network management application that can provide automated migration of a network to tunnel-less encryption.

Techniques for migrating a network to tunnel-less encryption are described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
   2.0 Structural and Functional Overview of Migration Techniques
   3.0 Detailed Example of Migration
   4.0 Implementation Mechanisms-Hardware Overview
   5.0 Extensions and Alternatives
   1.0 General Overview In an embodiment, a method comprises, in a data communication network comprising a plurality of VPN gateway devices that are configured only for plaintext data communication, logically partitioning the VPN gateway devices into one or more groups, and each of the sub-groups comprises a set of devices that protect local area network (LAN) addresses from the same CIDR (Classless Inter-Domain Routing) block; configuring a policy server with a security policy comprising an Internet Protocol security (IPsec) security association having an access control list comprising DO NOT ENCRYPT statements, one or more DO NOT ENCRYPT statements for sub-groups in which tunnel-less encryption is not configured, and PERMIT statements matching packets to be encrypted; selecting one of the sub-groups; configuring each of the VPN gateway devices in the selected sub-group for tunnel-less encryption by: configuring each device in a passive mode of operation in which the device is configured to receive either encrypted packets or plaintext packets matching encryption policy; configuring local policy to include local DO NOT ENCRYPT statements matching traffic that is currently being converted to ciphertext; removing, from the access control list of the policy server, DO NOT ENCRYPT statements referring to protected LAN CIDR blocks behind the VPN gateway devices in the selected sub-group; verifying connectivity of each VPN gateway device in the selected sub-group; configuring the sub-group to send encrypted packets from one of the VPN gateway devices in the selected sub-group, the local DO NOT ENCRYPT statements for the CIDR blocks currently being converted and protected by the selected sub-group, verifying connectivity of that VPN gateway device, and repeating the removing and verifying connectivity for each other VPN gateway device in the selected sub-group; repeating the configuring each of the VPN gateway devices in the selected sub-group for tunnel-less encryption, and the configuring the sub-group to send encrypted packets, for each other one of the sub-groups; and removing the passive mode on each of the VPN gateway devices.

In this context, "policy server" generally refers to a special-purpose computer, process or software element that is configured to distribute policy, encryption keys, or a combination. The policy server may be configured as a group controller or management station. Further, in this context, a DO NOT ENCRYPT statement is a policy instructing a VPN gateway device to not encrypt packets referenced by the statement. In certain systems offered by Cisco Systems, Inc., a DO NOT ENCRYPT statement may be implemented in the form of a DENY statement but the term "DENY statement" in other systems, is not necessarily equivalent to the DO NOT ENCRYPT statement described herein; for example, a DENY statement may often refer to refusing entry of packets into a network rather than not encrypting.

In an embodiment, a method comprises, in a data communication network comprising a plurality of VPN gateway devices that are configured only for plaintext data communication, configuring a policy server with a security policy including DO NOT ENCRYPT statements temporarily overriding PERMIT statements defining which packets should be encrypted; selecting one sub-group among one or more groups of the VPN gateway devices in which tunnel-less encryption is not configured; configuring each of the VPN gateway devices in the selected sub-group for tunnel-less encryption by: configuring each device in a passive mode of operation in which the device is configured to receive either encrypted packets or plaintext packets matching encryption policy; configuring local DO NOT ENCRYPT statements matching traffic that is currently being converted to ciphertext; removing, from the access control list of the policy server, DO NOT ENCRYPT statements referring to protected LAN CIDR blocks behind the VPN gateway devices in the selected sub-group; configuring the sub-group to send encrypted packets by removing, from each of the VPN gateway devices in the selected sub-group, the local DO NOT ENCRYPT statements for the CIDR blocks currently being converted and protected by the selected sub-group; repeating the configuring each of the VPN gateway devices in the selected sub-group for tunnel-less encryption, and the configuring the sub-group to send encrypted packets, for each other one of the sub-groups; and removing the passive mode on each of the VPN gateway devices.

In one feature, the method further comprises configuring the policy server with a security policy comprising DO NOT ENCRYPT statements matching control plane traffic, DO NOT ENCRYPT statements for one or more sub-groups of the VPN gateway devices in which tunnel-less encryption is not configured, and PERMIT statements matching packets to be encrypted.

In one feature, the method further comprises logically partitioning the network into the sub-groups, and each of the sub-groups comprises a set of customer edge devices that protect local area network (LAN) addresses from the same CIDR (Classless Inter-Domain Routing) block.

In one feature, the method further comprises verifying connectivity of each VPN gateway device in the selected sub-group after configuring each of the VPN gateway devices in the selected sub-group for tunnel-less encryption.

In one feature, the method further comprises verifying connectivity of each VPN gateway device after configuring that VPN gateway device to send encrypted packets and before configuring another VPN gateway device in the same sub-group.

In one feature, configuring each of the VPN gateway devices in the selected sub-group for tunnel-less encryption comprises configuring each of the VPN gateway devices in the selected sub-group for Group Encrypted Transport (GET) VPN operation. In one feature, configuring local DO NOT ENCRYPT statements matching traffic that is currently being converted to ciphertext comprises any one of: configuring a "deny ip any any" statement in an Access Control List (ACL) of the VPN gateway device; or configuring an Access Control Entry (ACE) statement for each CIDR block in the ACL of the VPN gateway device.

In one feature, the method is performed without physically partitioning the network for routing purposes using separate logical interfaces or tunnels.

In other embodiments, the invention encompasses a computer apparatus and a computer-readable medium configured to carry out the foregoing steps.

2.0 Structural and Functional Overview of Migration Techniques

In an embodiment, a method allows converting a network from plaintext to encrypted operations while accommodating certain processing constraints. For example, an administrator may also wish to perform the conversion without an impact on connectivity. However, at the same time the administrator may require that the encryption is deployed incrementally, a few sites at a time. During the conversion process, the VPN gateways may be expected to encrypt packets whenever possible, and send cleartext packets otherwise. Furthermore, a network administrator may require that connectivity is validated at each step of the migration process to confirm that the network is operating properly and that network elements can communicate with one another. Achieving a network conversion using one or more of the foregoing constraints is difficult, especially in a large network in which the number of VPN gateways is from several hundred to several thousand.

Not all of the foregoing constraints are required in every embodiment.

Certain embodiments configure certain VPN gateways in a network to use a passive mode of operation during the migration process. In past approaches, VPN gateways have supported a passive mode of operation for other purposes. For example, Cisco IOS Software® from Cisco Systems, Inc., San Jose, Calif. has a feature that implements the Internet Protocol Security (IPsec) specifications and that supports passive mode between Internet Key Exchange (IKE) peers or IPsec peers. Passive mode allows a VPN gateway to receive either encrypted or plaintext packets matching encryption policy, and in an embodiment, the use of passive mode allows a smooth migration in which CE devices are converted incrementally.

However, in an embodiment, when passive mode is used as part of a staged deployment, a persistent "passive mode" is configured in security associations with GET VPN. The following commands may be used, for example:

crypto gdoi group <groupname>passive

Further information about using passive mode in an embodiment is provided in other sections below.

In an embodiment, during the conversion process the VPN gateways are expected to encrypt packets whenever possible, and send cleartext packets otherwise. Since tunnel-less VPN methods such as GET VPN have no concept of a "peer", the state of a peer is not known to a VPN gateway. In an embodiment, a migration process is based on CIDR (Classless Inter-Domain Routing) blocks of addresses that VPN gateways protect, since a VPN gateway can be instructed whether a particular CIDR block is to be encrypted or plaintext. VPN gateways within a particular CIDR block are converted as a sub-group within the VPN.

In an embodiment, a method provides for incrementally converting a network to encryption when a VPN gateway does not know an identity of a peer, and thus doesn't know whether that peer can process encrypted packets or not.

In an embodiment, a migration process uses the ability of a VPN gateway to accept packets matching records in the IPsec security policy database as either cleartext or encrypted packets. This property allows a VPN gateway to receive packets from any other VPN gateway. However, a VPN gateway needs to know whether or not to encrypt a packet before forwarding it and the present method addresses that issue.

In an embodiment, steps are followed to ensure a reliable conversion of a plain-text network to a tunnel-less VPN method, such as GET VPN, and the conversion allows small groups of VPN gateways to be converted while maintaining connectivity with the rest of the network. The approach is workable with an existing MPLS VPN network, and typically assumes that no encryption is deployed in the MPLS VPN. The approach also may assume that the customer does not wish to deploy GET VPN in the entire network as an atomic operation; rather, in an embodiment, customer edge router (CE) devices are deployed and incrementally transitioned to encryption. Embodiments are operable in networks having a large number (e.g., hundreds) of CE devices.

In an embodiment, GET VPN capability is added in a series of steps, including validation steps to ensure continued connectivity. The GET VPN deployment may be "staged" using groups of CE devices, so that each CE can be verified that it has full connectivity to the policy server, each CE is transitioned to encryption individually within the group, and each CE is fully enabled individually.

FIG. 1A illustrates a network configured with a network management application that can provide automated migration of a network to tunnel-less encryption. In an embodiment, a management station 102 is coupled to a plaintext network 104. The management station 102 may comprise a general-purpose computer of the type shown in FIG. 10 that hosts an operating system 106 and a network management application 108, which implements one or more of the steps described herein. Thus, when the network management application 108 executes, the management station 102 loads instructions that reconfigure the management station to perform the steps described herein and thus the configuration and operation of the management station are transformed to provide a different form of computer operation than previously possible.

In an embodiment, an administrator 103 also has access to the network 104 and can configure network elements using appropriate commands. The network 104 is typically configured for plaintext network forwarding and switching operations, that is, without the use of encryption. The network 104 may vary in topology and configuration but typically comprises a plurality of routers, switches, and other network infrastructure elements. The network elements may comprise a plurality of customer edge (CE) routers that are positioned at logical edges of the network 104. An edge, in this sense, is a point at which the network 104 interconnects to another network or internetwork. In some embodiments the entire network 104 is owned or operated by a single business enterprise that has a customer relationship with a network service provider and therefore the edge network elements are termed "customer edge" elements to distinguish them from routers, switches and other network elements that are owned or operated by the service provider. In this embodiment, CE devices act as VPN gateways.

In an embodiment, network 104 comprises a policy server 109 that stores encryption keys and related policy data. The use of policy server 109 is further described herein.

Figure 1B:
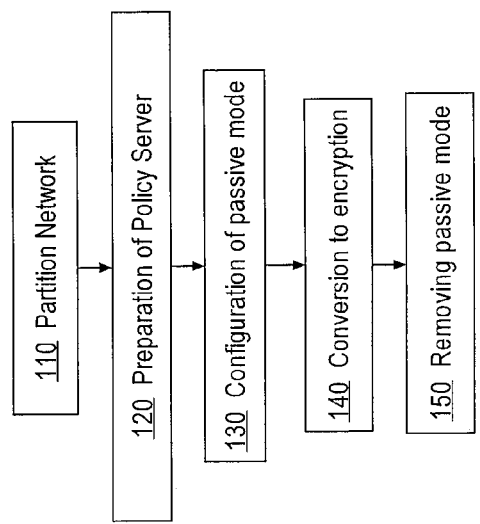
FIG. 1B illustrates a process of migrating a network to tunnel-less encryption.

FIG. 1B illustrates a process of migrating a network to tunnel-less encryption. In an embodiment, a migration process generally comprises the following steps, which may be performed manually or automatically under computer program control, in whole or in part:

1. Planning for Deployment. In an embodiment, as shown in step 110 of FIG. 1B, the process logically partitions the CE devices in the security group into sub-groups. In one approach, an ideal sub-group is defined as a set of CE devices protecting LAN addresses from the same CIDR block, because each sub-group can be represented with ACE statements in an ACL. Thus, in one approach, the VPN gateways in the group are logically divided into sub-groups, according to the CIDR blocks that they protect.

Figure 2:
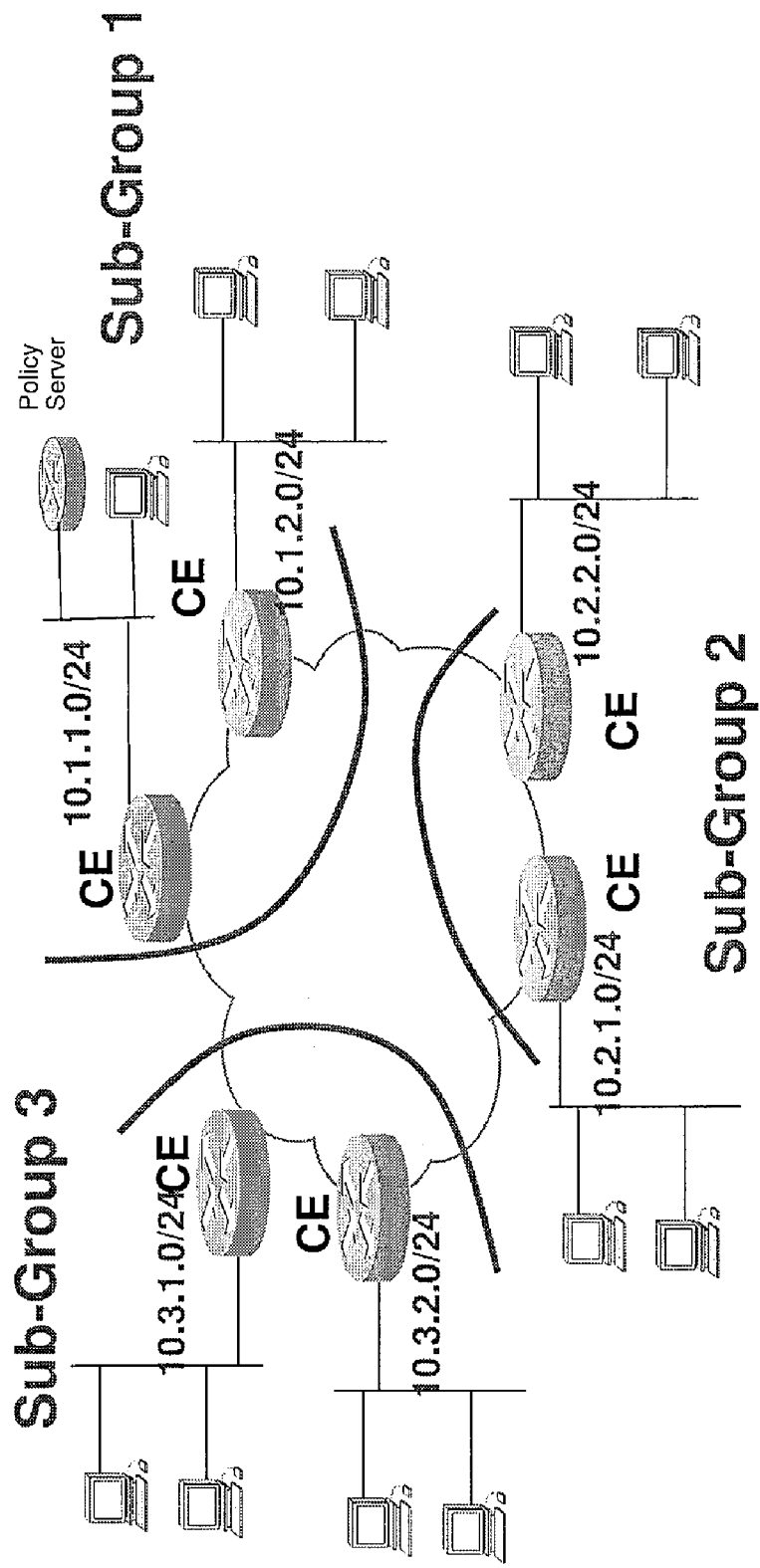
FIG. 2 illustrates an example network and logically partitioning customer edge routers into sub-groups.

FIG. 2 illustrates an example network and logically partitioning customer edge routers into sub-groups. In the example of FIG. 2, the network comprises six routers denoted CE that are logically divided into three sub-groups denoted 1, 2, and 3. A policy server (KS) is coupled to one of the CE devices and one or more host computers are coupled to each of the CE devices.

Step 1 may be performed manually, or may be performed automatically using computer program logic that analyzes data representing a network topology and identifying the topological position of CE devices and LAN addresses that they protect.

2. Preparation of the Policy server. As seen in FIG. 1B, step 120, preparation of the policy server is performed next. A policy server may be deployed in network 104 if the network did not previously have a policy server. The policy server configures traffic selectors as part of group policy using an access control list (ACL). The ACL comprises, among other data elements, a set of "deny" statements based on CIDR blocks, which causes these packets to be not encrypted, and a final statement stating that all IP packets should be encrypted. The "deny" statements are temporary but help ensure that the migration is orderly.

In an embodiment, preparation of the policy server comprises enabling policy on the policy server, including an IPsec SA with an ACL including the following components:

A. Deny statements matching control plane traffic, such as:
deny ip any 224.0.0.13 (PIM to/from PE)
deny eigrp any any (EIGRP to/from PE)

B. Deny statements for CE groups where GET VPN is not yet deployed, such as:
deny any 10.1.0.0 255.255.0.0
deny any 10.2.0.0 255.255.0.0
deny any 10.3.0.0 255.255.0.0

C. Permit statements matching packets to be encrypted, such as "permit any any".

3. Configuration of passive mode is performed next, as shown in step 130 of FIG. 1B. Each sub-group is converted one-by-one. Within a sub-group, VPN gateways in subgroups are configured one by one to accept encrypted packets. In an embodiment, conversion of a single VPN gateway comprises several sub-steps including configuring passive mode, configuring a Group Domain of Interpretation (GDOI) group, and introducing additional ACE (access control entry) statements that are added to the ACL downloaded by the policy server. The ACE statements comprise local DO NOT ENCRYPT statements matching traffic currently being converted to ciphertext, assuming this is not the first group to be converted. The additional ACE statements take precedence, and are temporary during the conversion of a particular sub-group. Each CE therefore begins by sending plaintext packets. A validation step can be performed, ensuring that the VPN gateway is still in full communication with the network.

In an embodiment, the third step of the method comprises selecting a sub-group, such as one of the sub-groups of FIG. 2, and configuring each CE device in the sub-group for passive mode. The local deny statements can be as simple as "deny ip any any", or may be an ACE statement per CIDR block. For example, if the network is being deployed by sub-groups, and the sub-groups are arranged by CIDR blocks, the CE may have the following local deny statements for each CIDR block:

Sub-group 1 CE: deny any<group_2>; deny any<group_3>
Sub-group 2 CE: deny any<group_1>; deny any<group_3>
Sub-group 3 CE: deny any<group_1>; deny any<group_2>

As another example, critical services located at a data center may be excluded from encryption during the transition until confidence is achieved with the system through encryption between non-critical sites using the following statements:

Remote CE: deny any<data_center>
Data Center CE: deny<data_center>any

The process then removes the DO NOT ENCRYPT statements from the policy server ACL referring to the protected LAN CIDR blocks behind CE devices in this sub-group. Each CE in this sub-group will then accept both encrypted packets and plaintext matching the permit statements in the ACL. The process then verifies that each CE can communicate with the rest of the network (e.g., using IP SLA).

4. Conversion to encryption is performed next, as shown in step 140 of FIG. 1B. When all VPN devices within a sub-group have been converted to accept encrypted packets, they are converted to send encrypted packets to VPN gateways within the sub-group. The decision for encryption is based on the CIDR block. Communication with other un-converted sub-groups remains as plaintext. After a VPN gateway is converted, connectivity is verified.

In an embodiment, configuring the sub-group to send encrypted packets comprises converting each CE to send encrypted packets by removing the local deny statements for the CIDR blocks currently being converted protected by the sub-group. The group manager will then send encrypted packets to members of the sub-group that match the permit statements in the policy server policy, and plaintext packets otherwise, and will accept either plaintext or ciphertext packets matching the permit statements in the ACL and any packet in the deny statements. The process then verifies that the CE can communicate with the rest of the network (e.g., using IP SLA). The verification step is particularly useful for the first CE converted, because it requires all other CE devices to accept its encrypted packets. If any one of them is not configured properly, they cannot communicate. However, as each subsequent CE is converted the network is more likely to be stable.

Figure 3:
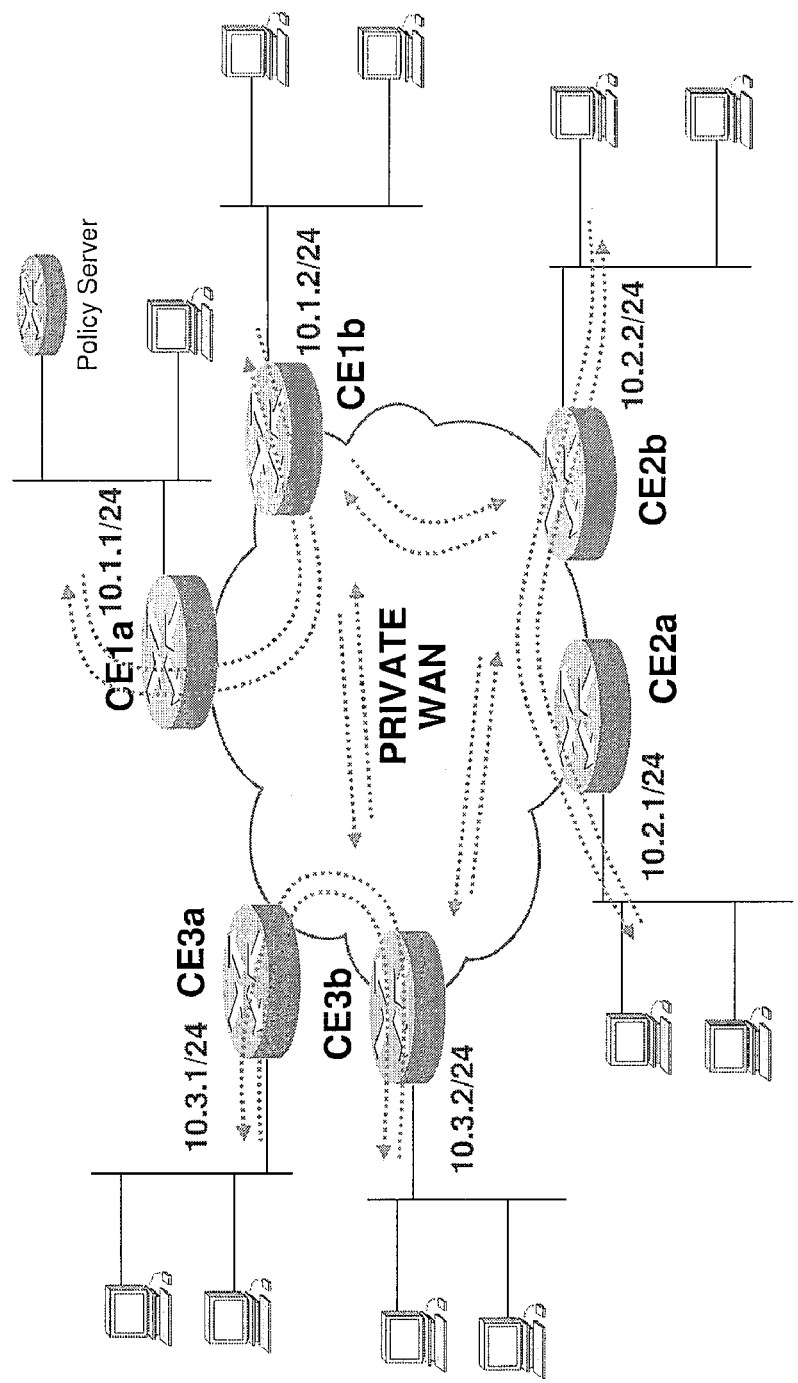
FIG. 3 illustrates traffic flows resulting from converting all sub-groups of the network of FIG. 2.

5. The process completes with removal of passive mode, as shown by step 150 of FIG. 1B. In an embodiment, step 3 and step 4 is repeated for each remaining subgroup. FIG. 3 illustrates traffic flows resulting from converting all sub-groups of the network of FIG. 2. When steps 3 and 4 have been completed for all sub-groups, each VPN gateway is individually taken out of passive mode, and connectivity is re-verified. Verification may comprise determining that each CE device can communicate with the rest of the network (e.g., validation through tools such as IP SLA). When this is done, all CE devices will be sending and receiving only encrypted traffic.

3.0 Detailed Example of Migration

A detailed example of performing migration of a plaintext network to encrypted operation is now described with reference to FIG. 4A to FIG. 9 inclusive.

Figure 4A:
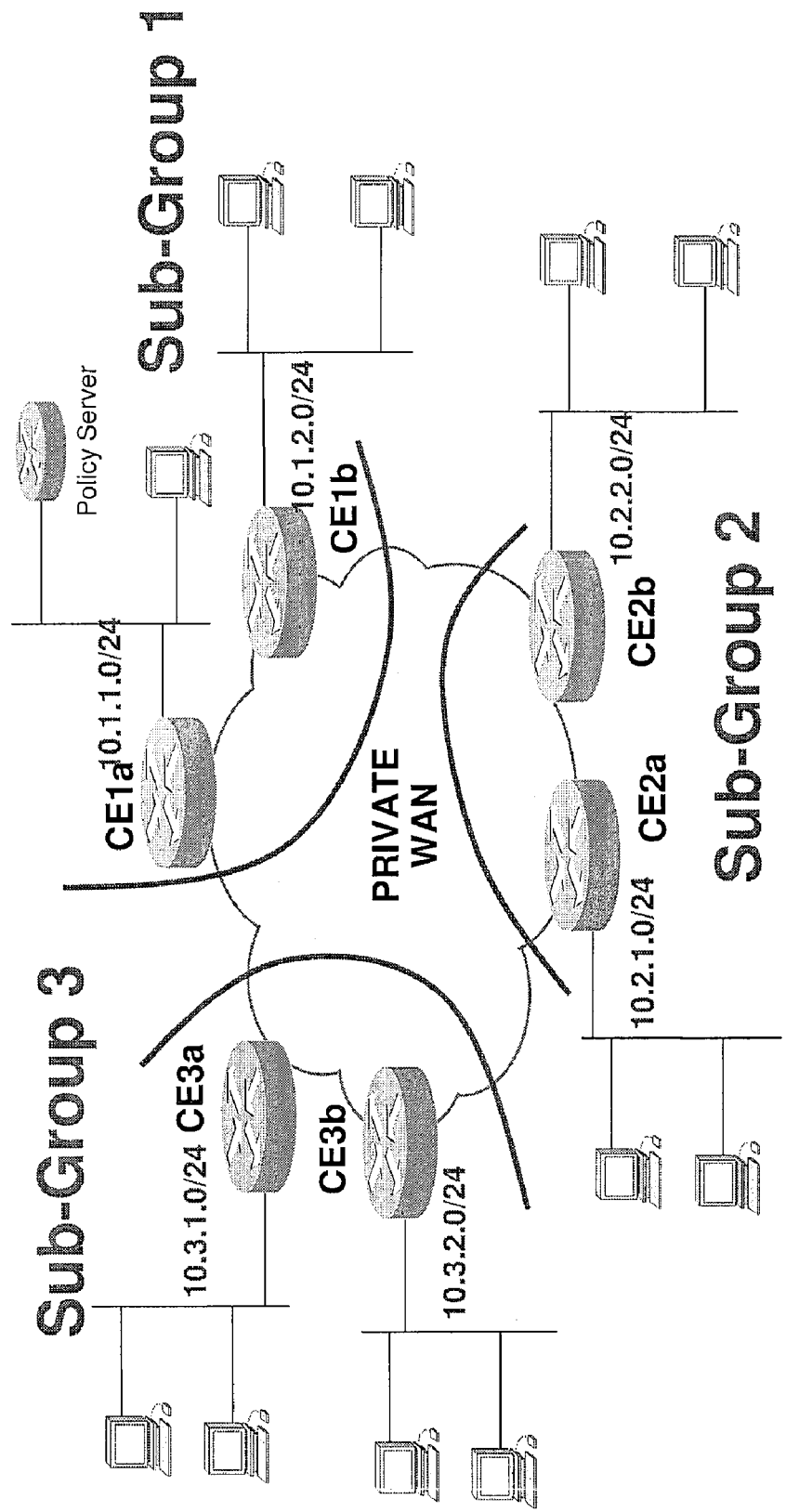
FIG. 4A illustrates a more specific example of dividing a network into sub-groups based on CIDR (Classless Inter-Domain Routing) block.

Referring first to FIG. 4A, in an embodiment, a first step of planning for deployment comprises logically separating the example network into three sub-groups of devices based on CIDR block of addresses that are protected by the devices. In addition, locations of policy servers are selected. In the case of FIG. 4A, the network is divided into three sub-groups denoted Sub-Group 1, Sub-Group 2, and Sub-Group 3, and the policy server policy server is placed in Sub-Group 1.

Figure 4B:
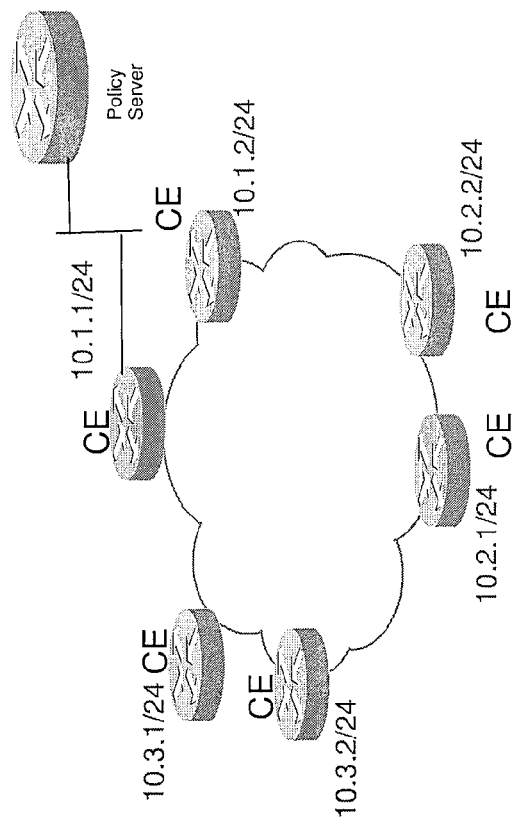
FIG. 4B illustrates preparation of a policy server.

In a second step, preparation of the policy server comprises configuring a GDOI Group on the policy server, including one IPsec SA with an ACL including DO NOT ENCRYPT statements temporarily overriding the PERMIT statements defining which packets should be encrypted. In an embodiment, the following CLI commands may be used:

crypto gdoi group dgvpn
    identity number 43
    server local
      sa ipsec 1
      profile gdoi-p
        match address ipv4 130
        replay time window-size 2
    access-list 130 deny ip any 224.0.0.13
    access-list 130 deny eigrp any any
    access-list 130 deny ip any 10.1.0.0 255.255.0.0
    access-list 130 deny ip any 10.2.0.0 255.255.0.0
    access-list 130 deny ip any 10.3.0.0 255.255.0.0
    access-list 130 permit ip any any At this point, as shown in FIG. 4B, both sending traffic flows and receiving traffic flows comprise plaintext.

Figure 4C:
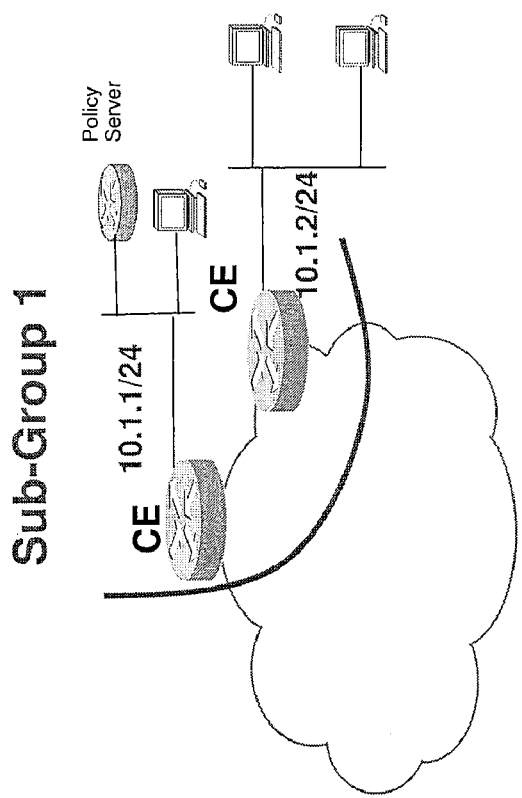
FIG. 4C illustrates configuring a sub-group.

In an embodiment, the devices in Sub-Group 1 are configured in passive mode. The following CLI commands may be used, for example:

crypto gdoi group dgvpn
      identity number 43
      server address ipv4 10.1.1.8
      passive A crypto map, including local deny statements, is also configured. In an embodiment, the following CLI commands may be used:

crypto map dgvpn 10 gdoi
      set group dgvpn
      match address 131
    access-list 131 deny ip any any The CE's effective ACL then is the concatenation of the local policy followed by the policy server policy statement:

deny ip any any
    deny ip any 224.0.0.13
    deny eigrp any any
    deny ip any 10.1.0.0 255.255.0.0
    deny ip any 10.2.0.0 255.255.0.0
    deny ip any 10.3.0.0 255.255.0.0
    permit ip any any At this point, as shown in FIG. 4C, traffic flows for the Group 1 CE devices are: in the sending direction, plaintext is sent to all destinations; in the receiving direction, plaintext is accepted, and ciphertext is also accepted.

Figure 5A:
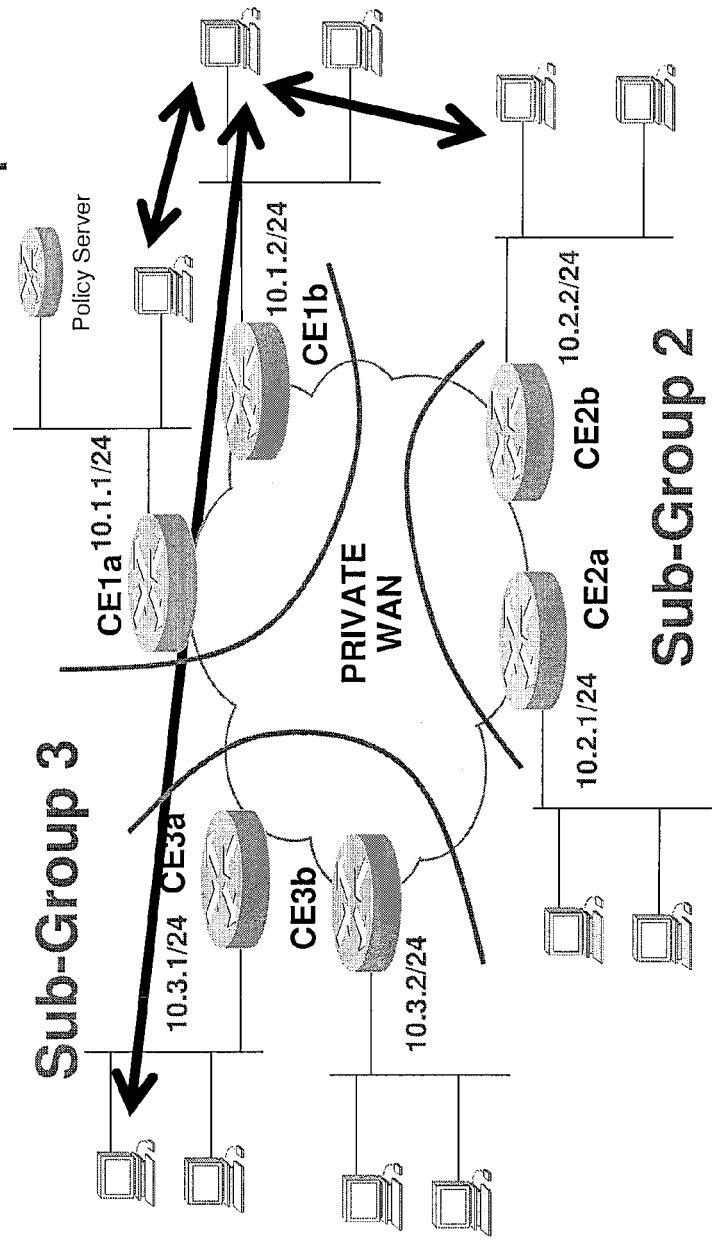
FIG. 5A illustrates verifying connectivity.

Configuration of the sub-group continues with removing a DENY on the policy server. For example, the DO NOT ENCRYPT statement referring to 10.1.0.0/16 is removed from the policy server, resulting in the traffic flows of FIG. 5A. In the example above, the statement "deny any 10.1.0.0 255.255.0.0" is removed. All traffic is still plaintext due to the GM local deny, and the combined effective ACL becomes:

deny ip any any
    deny ip any 224.0.0.13
    deny eigrp any any
    deny ip any 10.2.0.0 255.255.0.0
    deny ip any 10.3.0.0 255.255.0.0
    permit ip any any The process then verifies connectivity of the sub-group. In particular, as shown in FIG. 5A, hosts in Sub-Group 1 should be able to communicate in plaintext between themselves, and to Sub-Groups 1 and 2. IP SLA commands may be used to verify connectivity.

Figure 5B:
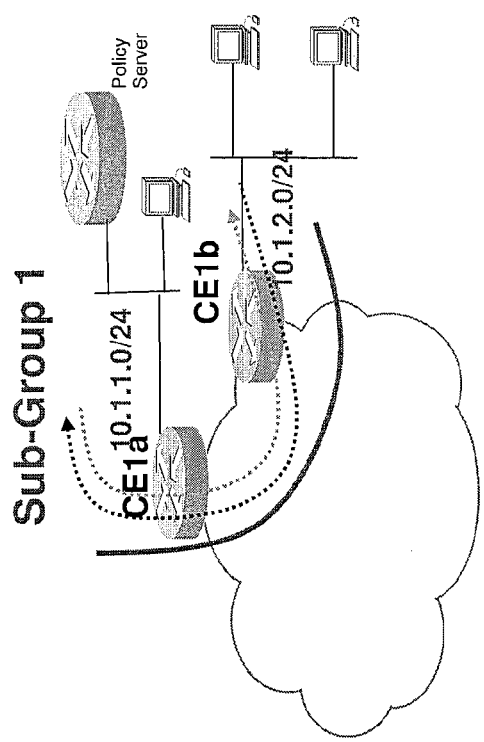
FIG. 5B illustrates changes in traffic flows resulting from removing a local DENY instruction from one device.
Figure 5C:
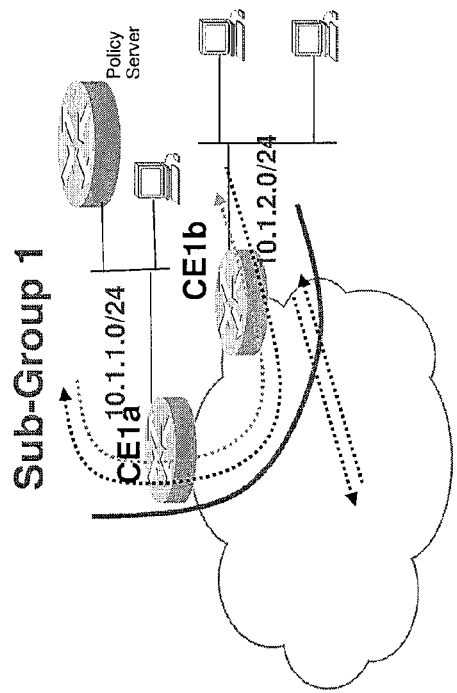
FIG. 5C illustrates changes in traffic flows resulting from removing a local DENY instruction from all of a sub-group.
Figure 6:
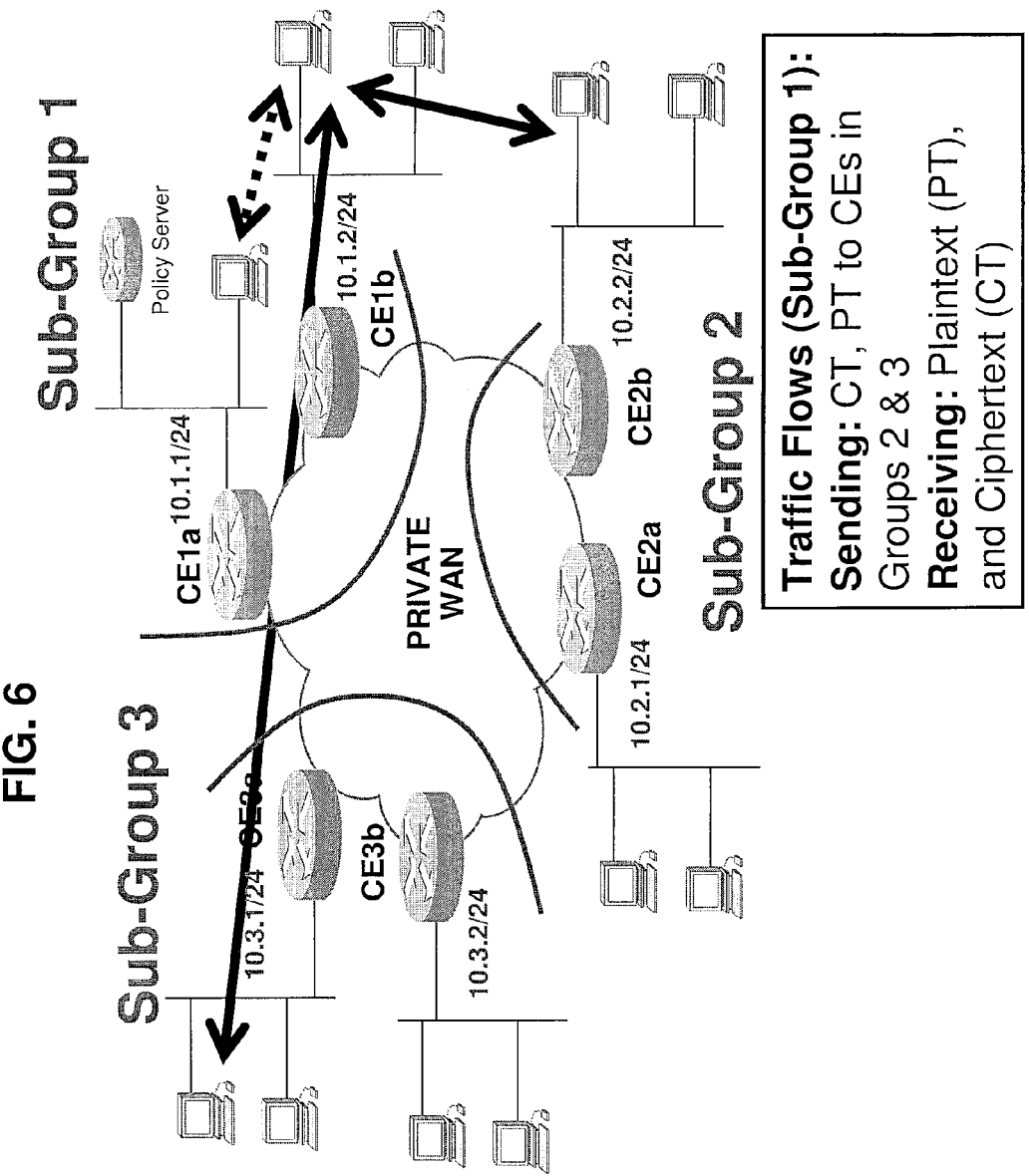
FIG. 6 illustrates verifying connectivity of a sub-group.

The process removes the local DO NOT ENCRYPT statement from a first device of Sub-Group 1, such as CE1a in FIG. 5B, resulting in the traffic flows shown in FIG. 5B. The statement "deny ip any any" is removed. As a result, traffic in the sending direction to CE1b is ciphertext, although return traffic from CE1b is still plaintext. In the sending direction, plaintext is sent to CE devices in Sub-Groups 2 and 3, and in the receiving direction, CE1a may accept plaintext or ciphertext. The combined effective ACL becomes:

deny ip any 224.0.0.13
deny eigrp any any
deny ip any 10.2.0.0 255.255.0.0
deny ip any 10.3.0.0 255.255.0.0
permit ip any any The process removes the local DO NOT ENCRYPT statement from all CE devices in Sub-Group 1, resulting in traffic flows as shown in FIG. 5C. The statement "deny ip any any" is removed. As a result, traffic between CE1a and CE1b is ciphertext, while traffic sent and received with other devices in Sub-Groups 2 and 3 remains plaintext. The combined effective ACL becomes:

deny ip any 224.0.0.13
deny eigrp any any
deny ip any 10.2.0.0 255.255.0.0
deny ip any 10.3.0.0 255.255.0.0
permit ip any any As shown in FIG. 6, the process then verifies connectivity within Sub-Group 1. In particular, hosts in Sub-Group 1 should be able to communicate in ciphertext between themselves, and in plaintext to devices in Sub-Groups 1 and 2. All devices in Sub-Group 1 should be able to receive either plaintext or ciphertext.

Figure 7:
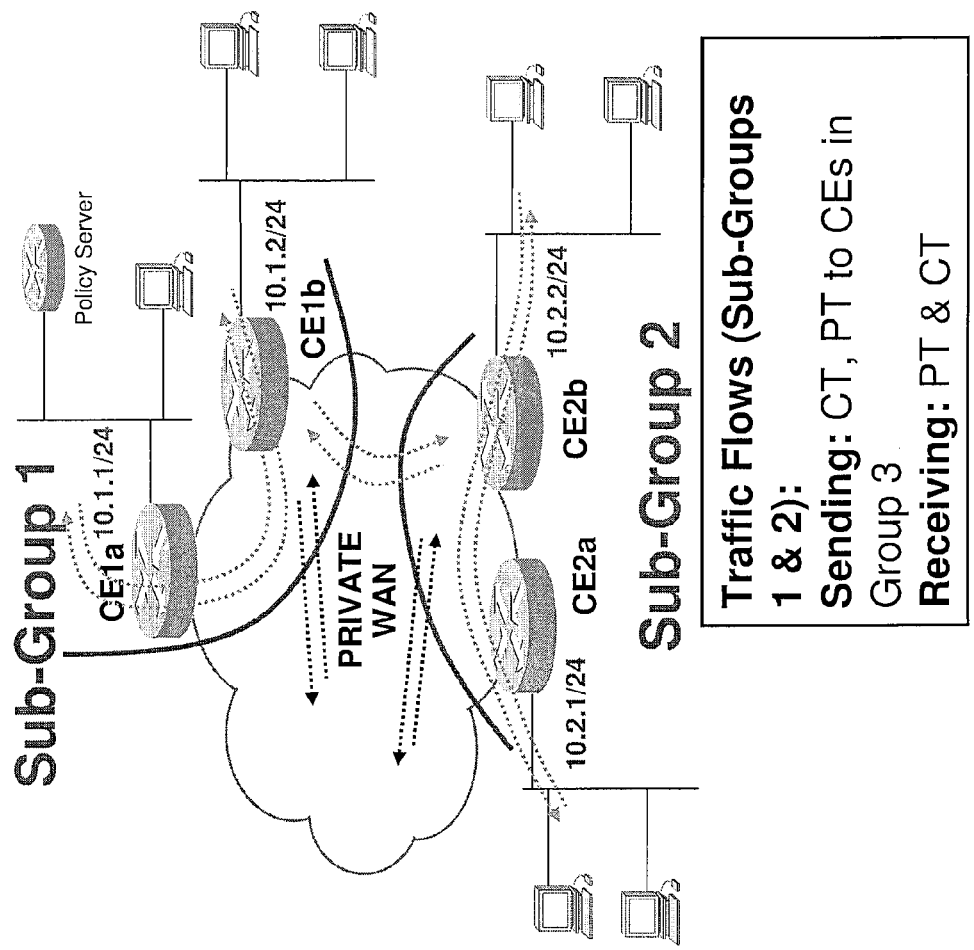
FIG. 7 illustrates repeating configuration steps for a second sub-group.
Figure 8:
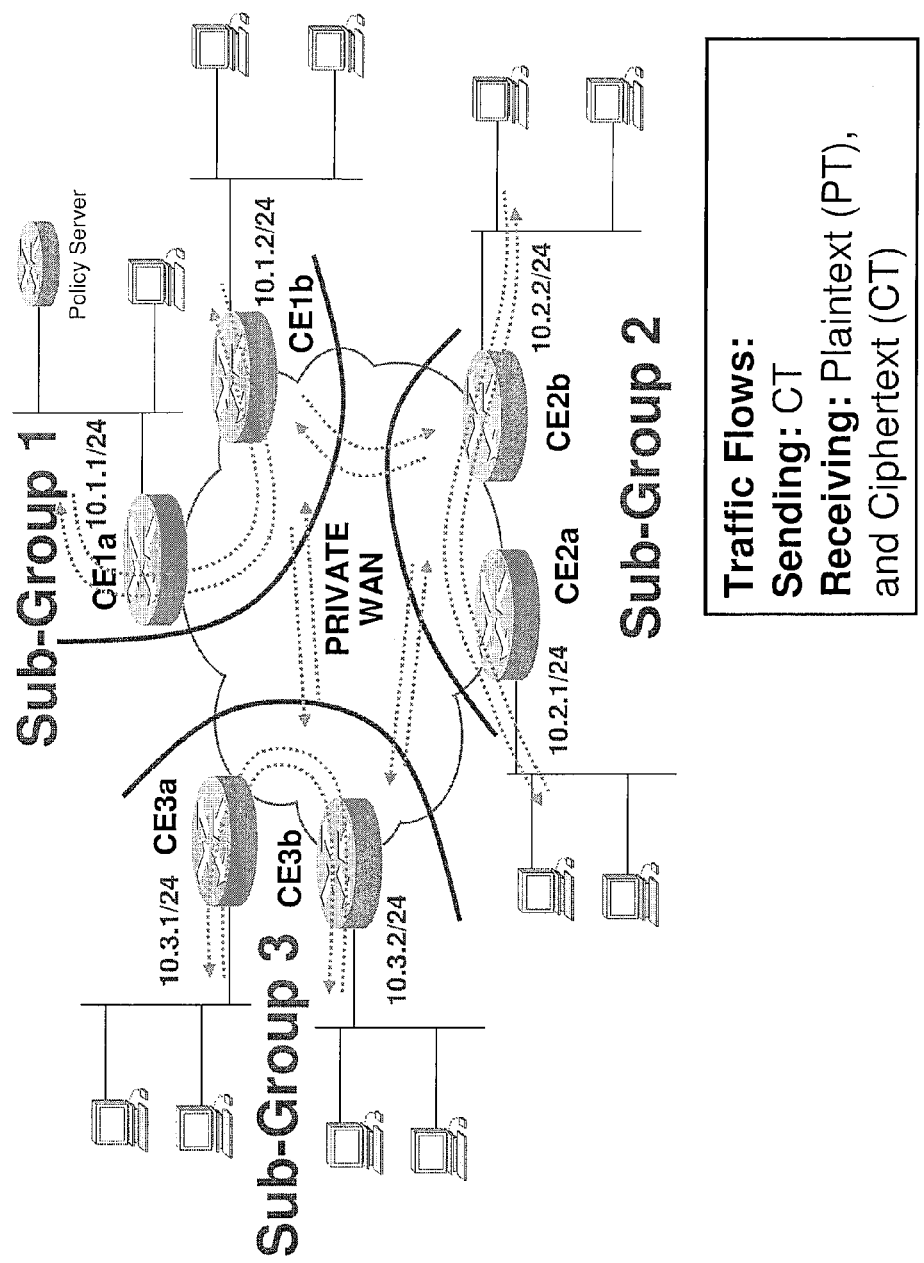
FIG. 8 illustrates repeating configuration steps for a third sub-group.

The operations described above for FIG. 5B are repeated for Sub-Group 2, resulting in traffic flows as illustrated in FIG. 7. In particular, the local DO NOT ENCRYPT statement is removed from devices in Sub-Group 2. Removing the "deny ip any any" statement allows devices within and between Sub-Groups 1 and 2 to use ciphertext. Traffic sent to CE devices in Sub-Group 3 continues to use plaintext, and devices in Sub-Groups 1 and 2 can receive traffic in either plaintext or ciphertext. The combined effective ACL for devices in Sub-Group 2 is:

deny ip any 224.0.0.13
deny eigrp any any
deny ip any 10.3.0.0 255.255.0.0
permit ip any any The operations described above for FIG. 5B are repeated for Sub-Group 3, resulting in traffic flows as illustrated in FIG. 8. In particular, the local DO NOT ENCRYPT statement is removed from devices in Sub-Group 3. Removing the "deny ip any any" statement allows devices within and between all of Sub-Groups 1, 2 and 3 to use ciphertext. Devices in Sub-Groups 1, 2, and 3 can receive traffic in either plaintext or ciphertext. The final ACL stored in the policy server is:

deny ip any 224.0.0.13
deny eigrp any any
permit ip any any

Figure 9A:
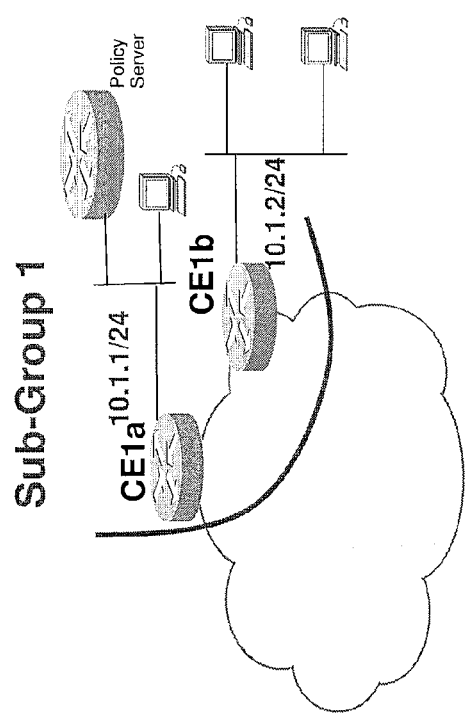
FIG. 9A illustrates removing passive mode.

Referring now to FIG. 9A, passive mode is removed from a first device of a first sub-group, such as device CE1b of Sub-Group 1. In an embodiment, the configuration command "passive" is removed. As a result, traffic flows in both the sending direction and receiving direction use ciphertext.

Figure 9B:
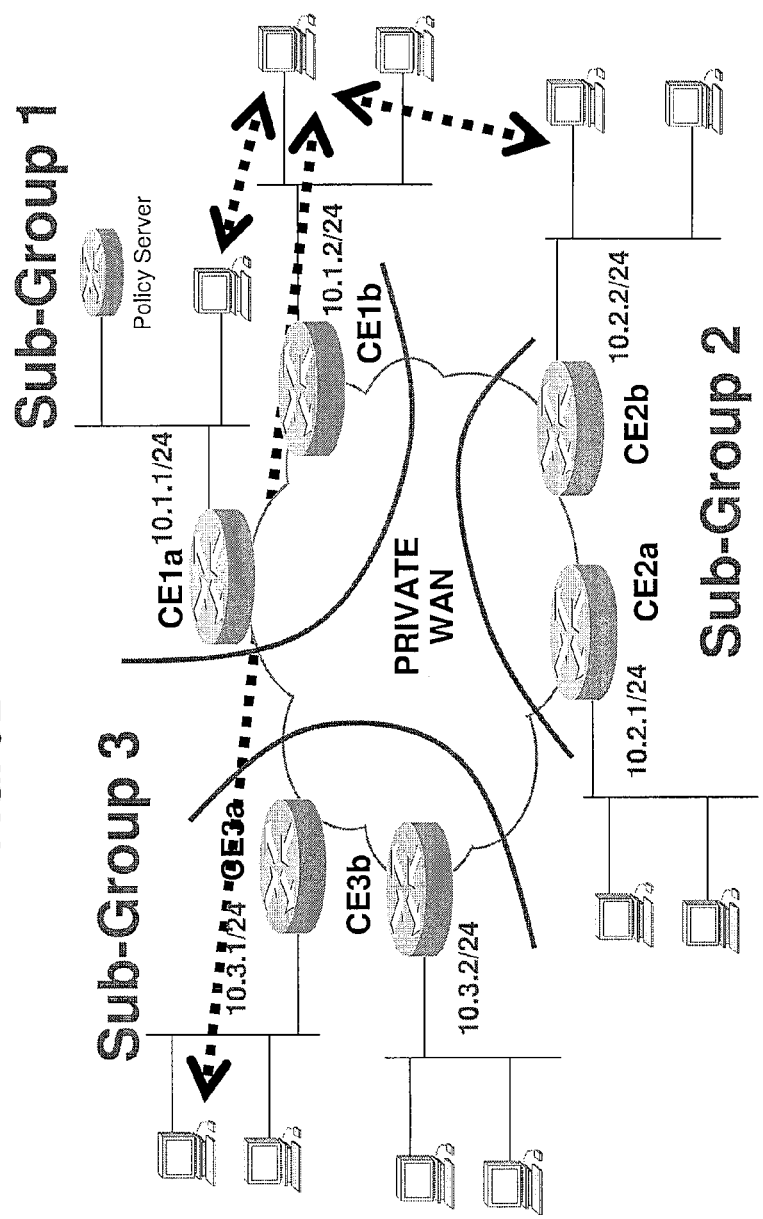
FIG. 9B illustrates verifying connectivity for the example network.

Referring now to FIG. 9B, the process verifies connectivity of hosts in Sub-Group 1. In particular, hosts behind CE1b should still be able to communicate with hosts in Sub-Group 1 and all other sub-groups. The passive mode is then removed from all other CE devices, preferably one at a time, and the process verifies that all CE devices can communicate with one another. Migration to tunnel-less encrypted operation is then complete.

In certain embodiments, one or more of the connectivity verification operations may be omitted. The use of periodic connectivity verification operations enhances robustness and reliability of the migration process by identifying communication problems as early as possible, but is not strictly required in every embodiment.

Based on the foregoing, it will be apparent that various embodiments can provide a system and method by which a global network of hundreds or thousands of routers can be transitioned to perform group encryption, without having to physically partition the network for routing purposes using separate logical interfaces or tunnels, without losing connectivity between any two members during the conversion process, which may take place over the span of weeks or months. During the conversion, routers transitioning to secure group members may send ciphertext to group members that can decrypt it and clear-text to routers that cannot decrypt it. Embodiments can result in a network that is incrementally transitioned to an encrypted environment that provides an increased level of security substantially sooner than in prior approaches.

A benefit is provided in the ability to migrate a global network to encryption without having to physically partition the network from a routing perspective using separate logical interfaces or tunnels. Certain previous methods have required the operator to build a virtual overlay network using point to point tunnels and encrypt the tunnels or build a separate VPN network and apply encryption to each site as it is transitioned to the new VPN. In sharp contrast, the present approach allows an operator to maintain the single routing domain without building an overlay or separate VPN routing domain, by defining secure zones and identifying the zones through encryption policies. The use of Passive Mode facilitates the ability to expand the scope of the secure zone without having to build a new overlay network (GRE tunnels, IPSec P2P tunnels) or diverse VPN segments to enable the transition (e.g. multiple MPLS VPN segments).

Embodiments are useful in any group service environment that relies on a homogeneous routing domain where no per-peer signaling is possible or viable. The use of Passive Mode allows a device to participate in an enhanced service state under certain constraints. Any other device not eligible to participate using the enhanced service state, such as encryption, can still participate using the lowest common denominator of capabilities.

In an embodiment, logic in network management application 108 can implement the aspects of the process herein as an automated feature. For example, network management application 108 can comprise logic configured to check the scope of address ranges protected by CE devices against a transition plan. The logic may be configured to highlight specific systems that are in-scope, but not ready to transition, to facilitate "sanity checking." Likewise, the management system could identify systems that need to transition, but are not within the scope of the defined transition plan.

Further, in an embodiment, network management application 108 may be configured to implement all steps of FIG. 1B using program logic. For example, step 110 may comprise the network management application 108 receiving identifying information about devices in a network from a topology database or inventory database, determining which devices are VPN gateway devices or CE devices, determining which CIDR blocks are protected by each such device, and creating and storing information defining logical sub-groups of the devices in local storage, memory or a database.

Step 120 may comprise network management application 108 identifying an address of a policy server in the network based on the inventory database, generating and sending configuration commands to the policy server that enable policy on the policy server including an IPsec security association with an ACL having the components that are described elsewhere herein, and confirming that the commands were executed without errors. Terminal emulation techniques, simple network management protocol (SNMP) GET and SET commands, or other programmatic means may be used to send CLI commands to the policy server using known approaches for configuring devices under program control.

Similarly, step 130 may comprise network management application 108 obtaining addresses of devices in a particular sub-group from the database, memory or other storage, forming CLI commands that configure passive mode on each device, configure a GDOI group, and add local DO NOT ENCRYPT statements as further described herein, and automatically programmatically submitting the CLI commands to each device. DO NOT ENCRYPT statements may be removed from the policy server ACL referring to protected LAN CIDR blocks behind CE devices in the sub-group using the same kind of automatic programmatic means. Connectivity among devices may be verified automatically as part of step 130 using IP SLA techniques and/or sending SNMP requests to the devices.

Step 140 may be implemented by using program instructions in network management application 108 to convert each CE one by one to send encrypted packets by removing the local DO NOT ENCRYPT statements for the CIDR blocks currently being converted and protected by the sub-group, by programmatically submitting CLI commands to change the ACL at the policy server. Connectivity among devices may be verified automatically as part of step 140 using IP SLA techniques and/or sending SNMP requests to the devices.

Step 150 may be implemented by using program instructions in network management application 108 to remove the passive mode on each CE. Connectivity among devices may be verified automatically as part of step 150 using IP SLA techniques and/or sending SNMP requests to the devices.

One or more of the steps of FIG. 1B may be implemented in a graphical user interface of network management application 108. For example, the network management application 108 can use the GUI to present information about proposed sub-groups to a user for verification before the sub-groups are actually created, and can receive user input modifying the arrangement of the sub-groups. The network management application 108 also can create CLI commands for use in one or more of the preceding steps and present the CLI commands to a user in a GUI screen display for confirmation before the CLI commands are actually sent to the devices. Error information resulting from sending CLI commands may be displayed in a terminal window, status window or other error display. The terminal window, status window or other display may also show the results of connectivity verification tests that are automatically performed by the network management application 108. Thus, the network management application 108 may provide an interactive system in which all steps of FIG. 1B are automated in program code but in which a user or administrator can follow the progress of migration, correct erroneous data, or pause and resume the automated steps.

4.0 Implementation Mechanisms-Hardware Overview

Figure 10:
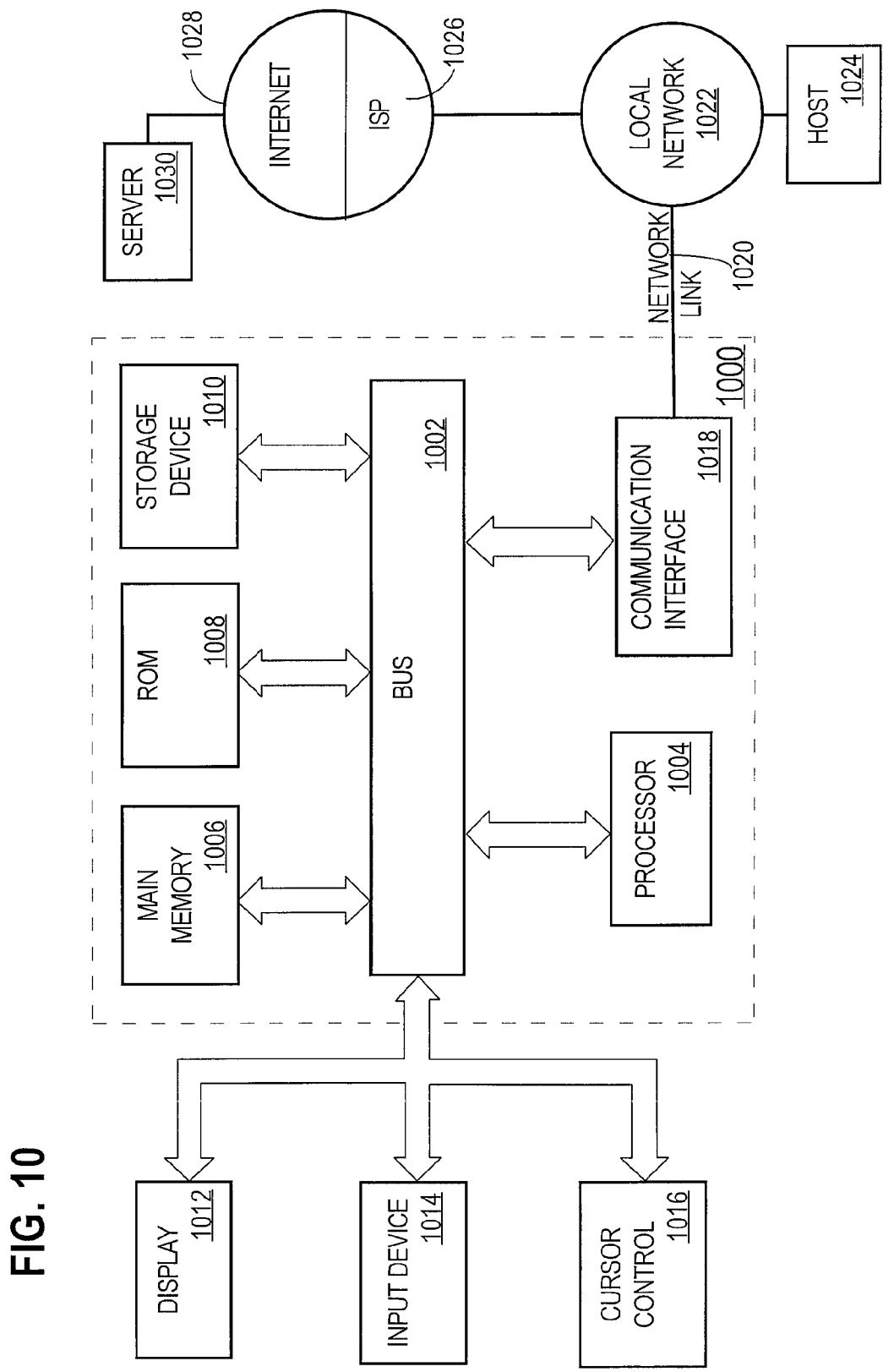
FIG. 10 illustrates a computer system upon which an embodiment may be implemented.

FIG. 10 is a block diagram that illustrates a computer system 1000 upon which an embodiment of the invention may be implemented. Computer system 1000 includes a bus 1002 or other communication mechanism for communicating information, and a processor 1004 coupled with bus 1002 for processing information. Computer system 1000 also includes a main memory 1006, such as a random access memory (RAM) or other dynamic storage device, coupled to bus 1002 for storing information and instructions to be executed by processor 1004. Main memory 1006 also may be used for storing temporary variables or other intermediate information during execution of instructions to be executed by processor 1004. Computer system 1000 further includes a read only memory (ROM) 1008 or other static storage device coupled to bus 1002 for storing static information and instructions for processor 1004. A storage device 1010, such as a magnetic disk or optical disk, is provided and coupled to bus 1002 for storing information and instructions.

Computer system 1000 may be coupled via bus 1002 to a display 1012, such as a cathode ray tube (CRT), for displaying information to a computer user. An input device 1014, including alphanumeric and other keys, is coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane.

The invention is related to the use of computer system 1000 for implementing the techniques described herein. According to one embodiment of the invention, those techniques are performed by computer system 1000 in response to processor 1004 executing one or more sequences of one or more instructions contained in main memory 1006. Such instructions may be read into main memory 1006 from another machine-readable medium, such as storage device 1010. Execution of the sequences of instructions contained in main memory 1006 causes processor 1004 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 1000, various machine-readable media are involved, for example, in providing instructions to processor 1004 for execution. Such a medium may take many forms, including but not limited to storage media and transmission media. Storage media includes both non-volatile media and volatile media. Non-volatile media includes, for example, optical or magnetic disks, such as storage device 1010. Volatile media includes dynamic memory, such as main memory 1006. Transmission media includes coaxial cables, copper wire and fiber optics, including the wires that comprise bus 1002. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable storage media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, or any other memory chip or cartridge.

Various forms of machine-readable storage media may be involved in carrying one or more sequences of one or more instructions to processor 1004 for execution. For example, the instructions may initially be carried on a magnetic disk of a remote computer. The remote computer can load the instructions into its dynamic memory and send the instructions over a telephone line using a modem. A modem local to computer system 1000 can receive the data on the telephone line and use an infra-red transmitter to convert the data to an infra-red signal. An infra-red detector can receive the data carried in the infra-red signal and appropriate circuitry can place the data on bus 1002. Bus 1002 carries the data to main memory 1006, from which processor 1004 retrieves and executes the instructions. The instructions received by main memory 1006 may optionally be stored on storage device 1010 either before or after execution by processor 1004.

Computer system 1000 also includes a communication interface 1018 coupled to bus 1002. Communication interface 1018 provides a two-way data communication coupling to a network link 1020 that is connected to a local network 1022. For example, communication interface 1018 may be an integrated services digital network (ISDN) card or a modem to provide a data communication connection to a corresponding type of telephone line. As another example, communication interface 1018 may be a local area network (LAN) card to provide a data communication connection to a compatible LAN. Wireless links may also be implemented. In any such implementation, communication interface 1018 sends and receives electrical, electromagnetic or optical signals that carry digital data streams representing various types of information.

Network link 1020 typically provides data communication through one or more networks to other data devices. For example, network link 1020 may provide a connection through local network 1022 to a host computer 1024 or to data equipment operated by an Internet Service Provider (ISP) 1026. ISP 1026 in turn provides data communication services through the world wide packet data communication network now commonly referred to as the "Internet" 1028. Local network 1022 and Internet 1028 both use electrical, electromagnetic or optical signals that carry digital data streams. The signals through the various networks and the signals on network link 1020 and through communication interface 1018, which carry the digital data to and from computer system 1000, are exemplary forms of transporting the information.

Computer system 1000 can send messages and receive data, including program code, through the network(s), network link 1020 and communication interface 1018. In the Internet example, a server 1030 might transmit a requested code for an application program through Internet 1028, ISP 1026, local network 1022 and communication interface 1018.

The received code may be executed by processor 1004 as it is received, and/or stored in storage device 1010, or other non-volatile storage for later execution. In this manner, computer system 1000 may obtain application code.

5.0 Extensions and Alternatives

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method, comprising:
configuring a policy server, in a data communication network comprising a plurality of VPN gateway devices that are configured only for plaintext data communication, with a security policy including DO NOT ENCRYPT statements temporarily overriding PERMIT statements defining which packets should be encrypted;
selecting one sub-group among one or more groups of the VPN gateway devices in which tunnel-less encryption is not configured;
configuring each of the VPN gateway devices in the selected sub-group for tunnel-less encryption by: configuring each device in a passive mode of operation in which the device is configured to receive either encrypted packets or plaintext packets matching encryption policy; configuring local DO NOT ENCRYPT statements matching traffic that is currently being converted to ciphertext; removing, from an access control list of the policy server, DO NOT ENCRYPT statements referring to protected local area network classless inter-domain routing (LAN CIDR) blocks behind the VPN gateway devices in the selected sub-group;
configuring the sub-group to send encrypted packets by removing, from each of the VPN gateway devices in the selected sub-group, the local DO NOT ENCRYPT statements for the protected LAN CIDR blocks currently being converted and protected by the selected sub-group;
repeating the configuring each of the VPN gateway devices in the selected sub-group for tunnel-less encryption, and the configuring the sub-group to send encrypted packets, for each other one of the sub-groups;
removing the passive mode on each of the VPN gateway devices.

2. The method of claim 1, further comprising configuring the policy server with a security policy comprising DO NOT ENCRYPT statements matching control plane traffic, DO NOT ENCRYPT statements for one or more sub-groups of the VPN gateway devices in which tunnel-less encryption is not configured, and PERMIT statements matching packets to be encrypted.

3. The method of claim 1, further comprising logically partitioning the network into the sub-groups, wherein each of the sub-groups comprises a set of customer edge devices that protect local area network (LAN) addresses from the same CIDR (Classless Inter-Domain Routing) block.

4. The method of claim 1, further comprising verifying connectivity of each VPN gateway device in the selected sub-group after configuring each of the VPN gateway devices in the selected sub-group for tunnel-less encryption.

5. The method of claim 1, further comprising verifying connectivity of each VPN gateway device after configuring that VPN gateway device to send encrypted packets and before configuring another VPN gateway device in the same sub-group.

6. The method of claim 1, wherein configuring each of the VPN gateway devices in the selected sub-group for tunnel-less encryption comprises configuring each of the VPN gateway devices in the selected sub-group for Group Encrypted Transport (GET) VPN operation.

7. The method of claim 1, wherein configuring local DO NOT ENCRYPT statements matching traffic that is currently being converted to ciphertext comprises any one of: configuring a "deny ip any any" statement in an access control list (ACLS) of the VPN gateway device; or configuring an access control entry (ACES) statement for each CIDR block in the ACL of the VPN gateway device.

8. The method of claim 1, performed without physically partitioning the network for routing purposes using separate logical interfaces or tunnels.

9. The method of claim 1, wherein configuring each of the VPN gateway devices in the selected sub-group for tunnel-less encryption comprises configuring a group key management system.

10. The method of claim 1, wherein configuring each of the VPN gateway devices in the selected sub-group for tunnel-less encryption comprises configuring a Group Domain of Interpretation (GDOI) key server.

11. A non-transitory computer-readable storage medium storing one or more sequences of instructions which, when executed by one or more processors, cause the one or more processors to perform:
configuring a policy server, in a data communication network comprising a plurality of VPN gateway devices that are configured only for plaintext data communication, with a security policy including DO NOT ENCRYPT statements temporarily overriding PERMIT statements defining which packets should be encrypted;
selecting one sub-group among one or more groups of the VPN gateway devices in which tunnel-less encryption is not configured;
configuring each of the VPN gateway devices in the selected sub-group for tunnel-less encryption by: configuring each device in a passive mode of operation in which the device is configured to receive either encrypted packets or plaintext packets matching encryption policy; configuring local DO NOT ENCRYPT statements matching traffic that is currently being converted to ciphertext; removing, from an access control list of the policy server, DO NOT ENCRYPT statements referring to protected local area network classless inter-domain routing (LANCIDR) blocks behind the VPN gateway devices in the selected sub-group;
configuring the sub-group to send encrypted packets by removing, from each of the VPN gateway devices in the selected sub-group, the local DO NOT ENCRYPT statements for the protected LAN CIDR blocks currently being converted and protected by the selected sub-group;
repeating the configuring each of the VPN gateway devices in the selected sub-group for tunnel-less encryption, and the configuring the sub-group to send encrypted packets, for each other one of the sub-groups;
removing the passive mode on each of the VPN gateway devices.

12. The non-transitory computer-readable storage medium of claim 11, further comprising instructions which when executed cause configuring the policy server with a security policy comprising DO NOT ENCRYPT statements matching control plane traffic, DO NOT ENCRYPT statements for one or more sub-groups of the VPN gateway devices in which tunnel-less encryption is not configured, and PERMIT statements matching packets to be encrypted.

13. The non-transitory computer-readable storage medium of claim 11, further comprising instructions which when executed cause logically partitioning the network into the sub-groups, wherein each of the sub-groups comprises a set of customer edge devices that protect local area network (LAN) addresses from the same CIDR (Classless Inter-Domain Routing) block.

14. The non-transitory computer-readable storage medium of claim 11, further comprising instructions which when executed cause verifying connectivity of each VPN gateway device in the selected sub-group after configuring each of the VPN gateway devices in the selected sub-group for tunnel-less encryption.

15. The non-transitory computer-readable storage medium of claim 11, further comprising instructions which when executed cause verifying connectivity of each VPN gateway device after configuring that VPN gateway device to send encrypted packets and before configuring another VPN gateway device in the same sub-group.

16. The non-transitory computer-readable storage medium of claim 11, wherein the instructions which when executed cause configuring each of the VPN gateway devices in the selected sub-group for tunnel-less encryption comprise instructions which when executed cause configuring each of the VPN gateway devices in the selected sub-group for Group Encrypted Transport (GET) VPN operation.

17. The non-transitory computer-readable storage medium of claim 11, wherein the instructions which when executed cause configuring local DO NOT ENCRYPT statements matching traffic that is currently being converted to ciphertext comprise instructions which when executed cause any one of: configuring a "deny ip any any" statement in an access control list (ACL) of the VPN gateway device; or configuring an access control entry (ACES statement for each CIDR block in the ACL of the VPN gateway device.

18. The non-transitory computer-readable storage medium of claim 11, wherein the instructions are performed without physically partitioning the network for routing purposes using separate logical interfaces or tunnels.

19. A data processing apparatus, comprising:
one or more processors;
a non-transitory computer-readable storage medium coupled to the one or more processors and storing one or more sequences of instructions which, when executed by the one or more processors, cause the one or more processors to perform:
configuring a policy server, in a data communication network comprising a plurality of VPN gateway devices that are configured only for plaintext data communication, with a security policy including DO NOT ENCRYPT statements temporarily overriding PERMIT statements defining which packets should be encrypted;
selecting one sub-group among one or more groups of the VPN gateway devices in which tunnel-less encryption is not configured;
configuring each of the VPN gateway devices in the selected sub-group for tunnel-less encryption by: configuring each device in a passive mode of operation in which the device is configured to receive either encrypted packets or plaintext packets matching encryption policy; configuring local DO NOT ENCRYPT statements matching traffic that is currently being converted to ciphertext; removing, from an access control list of the policy server, DO NOT ENCRYPT statements referring to protected local area network classless inter-domain routing (LAN CIDR) blocks behind the VPN gateway devices in the selected sub-group;

configuring the sub-group to send encrypted packets by removing, from each of the VPN gateway devices in the selected sub-group, the local DO NOT ENCRYPT statements for the protected LAN CIDR blocks currently being converted and protected by the selected sub-group;

repeating the configuring each of the VPN gateway devices in the selected sub-group for tunnel-less encryption, and the configuring the sub-group to send encrypted packets, for each other one of the sub-groups;

removing the passive mode on each of the VPN gateway devices.

20. The apparatus of claim 19, further comprising instructions which when executed cause configuring the policy server with a security policy comprising DO NOT ENCRYPT statements matching control plane traffic, DO NOT ENCRYPT statements for one or more sub-groups of the VPN gateway devices in which tunnel-less encryption is not configured, and PERMIT statements matching packets to be encrypted.

21. The apparatus of claim 19, further comprising instructions which when executed cause logically partitioning the network into the sub-groups, wherein each of the sub-groups comprises a set of customer edge devices that protect local area network (LAN) addresses from the same CIDR (Classless Inter-Domain Routing) block.

* * * * *